United States Patent

Hanchett

[15] 3,680,068
[45] July 25, 1972

[54] ALARM CIRCUIT

[72] Inventor: George D. Hanchett, Summit, N.J.
[73] Assignee: RCA Corporation, New York, N.Y.
[22] Filed: Sept. 5, 1968
[21] Appl. No.: 757,573

[30] Foreign Application Priority Data

May 15, 1968 Great Britain .................. 23,101/68

[52] U.S. Cl. .................. 340/213, 340/228, 340/333, 307/288, 307/296
[51] Int. Cl. .................. G08b 23/00
[58] Field of Search .............. 340/213, 213.1, 227, 228, 229, 340/24 B, 234, 23 S, 384 E

[56] References Cited

UNITED STATES PATENTS

| | | | |
|---|---|---|---|
| 2,817,074 | 12/1957 | Faulkner | 340/213 |
| 3,076,897 | 2/1963 | Skirvin | 250/209 |
| 3,136,982 | 6/1964 | Sargent | 340/213.1 |
| 3,360,951 | 1/1968 | Hoenisch | 62/137 |
| 3,392,379 | 7/1968 | Thomason et al. | 340/213.1 |
| 3,454,925 | 7/1969 | Ruof | 340/57 |
| 3,456,251 | 7/1969 | Smith et al. | 340/213.1 |

*Primary Examiner*—Thomas B. Habecker
*Assistant Examiner*—Walter Benson
*Attorney*—Edward J. Norton

[57] ABSTRACT

Disclosed is an alarm circuit for detecting change in the condition of an ambient being monitored. Two voltage dependent regenerative switches are connected in parallel with a power supply that provides an intermittent voltage. A condition sensitive element is coupled to the circuit to cause one of said regenerative switches to be in a conducting state as a function of the condition being monitored. When a change occurs in the ambient, the other regenerative switch becomes conductive thereby activating an alarm device which is coupled thereto.

6 Claims, 3 Drawing Figures

INVENTOR
GEORGE D. HANCHETT
BY Edward J. Norton
ATTORNEY

INVENTOR
GEORGE D. HANCHETT
BY Edward J Norton
ATTORNEY

ALARM CIRCUIT

This invention relates generally to alarm circuits, and, more particularly, to an alarm circuit for detecting change in the condition of an ambient.

There are many instances wherein it is desirable to continuously monitor the condition of an ambient, e. g. temperature, pressure, humidity, illumination, etc., to detect any change which may occur therein. In the case of temperature, for example, it is often desirable to be aware of changes from a normal condition so that corrective action may be taken. Greenhouses, chicken incubators and brooders, etc., are instances where it is desirable to be forewarned of decreasing temperatures; refrigerators, freezers, furnace rooms, etc., are instances where it is desirable to be forewarned of rising temperatures. Furthermore, having detected a change in condition it is imperative that this information be conveyed via appropriate means so that corrective action may be taken.

Accordingly, it is an object of the present invention to provide a sensitive and reliable alarm circuit for monitoring the condition of an ambient and alerting the party concerned to a change in said condition from a predetermined norm.

In accordance with the present invention an alarm circuit for detecting change in the condition of an ambient comprises; first circuit means including a first pair of complementary transistors in a voltage dependent regenerative switch configuration; second circuit means including a second pair of complementary transistors in a voltage dependent regenerative switch configuration, said first and second circuit means being connected in parallel; means for supplying an intermittent voltage to said parallel combination; third circuit means including a sensing element, the condition of said sensing element rendering one of said regenerative switches conductive to the exclusion of the other in response to the application of said intermittent voltage; fourth circuit means including an alarm device, said alarm device being activated when a selected one of said regenerative switches is rendered conductive to the exclusion of the other.

The alarm circuit of the present invention will be described in a temperature indicating embodiment which indicates when a predetermined temperature has been reached, for instance by means of a flashing lamp. The circuit can be designed to be extremely sensitive so as to be able to differentiate fractions of a degree of temperature.

The novel features which are considered characteristic of the present invention are set forth in the appended claims. The invention itself, as well as additional objectives and advantages thereof, will be best understood upon reading the following description in conjunction with the accompanying drawings wherein:

Figure 1:
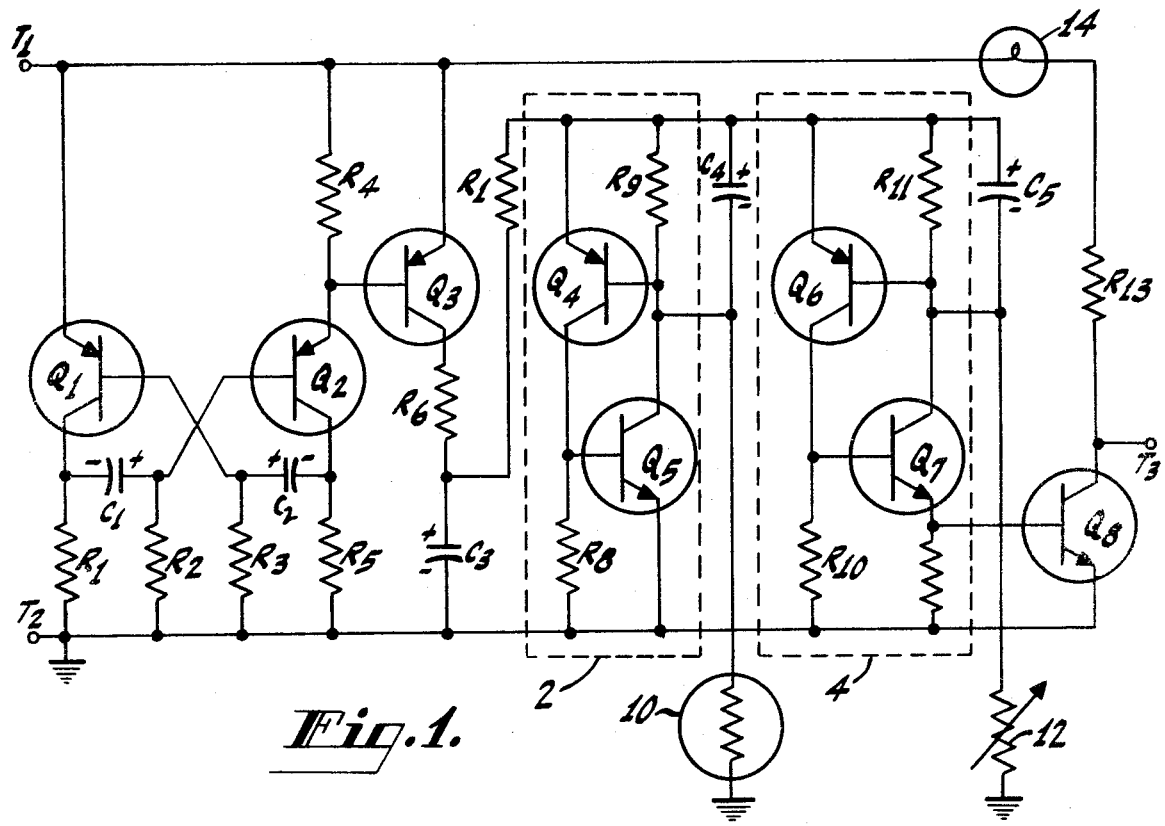
FIG. 1 is a schematic diagram of a temperature alarm circuit in accordance with the present invention.

As shown in FIG. 1, the circuit comprises two complementary transistor pairs each in a voltage dependent regenerative switch configuration 2, 4 which compares the resistance of a thermistor 10 (or other element whose resistance varies with temperature or other variable to be monitored) with that of a preset potentiometer 12. In the embodiment represented by FIG. 1 the circuit is wired to signal a decrease in temperature below a predetermined level.

Transistor pairs $Q_4$, $Q_5$ and $Q_6$, $Q_7$ form a pair of voltage-dependent regenerative switches 2, 4. With the circuit wired as shown in FIG. 1, the triggering level of the $Q_4$, $Q_5$ switch 2 is determined by the thermistor 10. The triggering voltage of the $Q_6$, $Q_7$ switch 4, on the other hand, is controlled by potentiometer 12. Because the two regenerative switches 2, 4 are in parallel, both experience an intermittent voltage generated by the multivibrator comprised of transistors $Q_1$ and $Q_2$, and amplified by transistor $Q_3$ which is switched on and off at a rate of approximately once per second. This intermittent voltage assures that the triggering voltages of the regenerative switches 2 and 4 will be sampled about once every second so that the switch with the lowest triggering voltage will conduct during the succeeding interval. Were this intermittent testing not performed, the first regenerative switch to conduct would continue to do so independent of the characteristics of the other.

As long as the thermistor resistance is lower than the resistance of potentiometer 12, the triggering voltage of regenerative switch 2 is lower than that of switch 4 and the thermistor-controlled switch 2 conducts, effectively shorting out the regenerative switch composed of transistors $Q_6 - Q_7$. More particularly, once conduction of a transistor regenerative switch has occurred the potential across the switch, i.e. from emitter to emitter, reduces a very low level of about 1.0 volt. This, in effect, removes the operating potential from the other switch preventing it from conducting for the remainder of the cycle. As the thermistor resistance increases, i.e. through cooling, the triggering voltage of switch 2 increases until it is above that of switch 4. When transistors $Q_6$ and $Q_7$ are triggered, they short out switch 2 and permit current to flow to the base of transistor $Q_8$. Transistor $Q_8$ then turns on and conducts current to the lamp 14. The fact that the regenerative-switch triggering voltages depend on the resistance of the thermistor 10 or sensitivity potentiometer 12 means that circuit operation is independent of fluctuations of voltage in the power supply.

To reverse the operation of the circuit so that the lamp will light with an increase in temperature, the thermistor 10 and sensitivity potentiometer 12 need merely be interchanged.

To adjust the circuit so that the indicator lamp 14 will flash when the temperature of interest has been reached, the thermistor 10 is placed in a temperature environment similar to that at which the circuit will be expected to give warning. The potentiometer shaft is then rotated until the lamp 14 just stops flashing. At this point the circuit is set to warn of the temperature of interest.

No special precautions need be observed in the construction of this circuit except the physical and electrical size of the sensitivity potentiometer should be determined by the application in which the circuit is to be used. Furthermore, to insure against the occurrence of damage to transistor $Q_6$, the potentiometer should be provided with a stop so that it always exhibits some predetermined minimum resistance. With the exception of the thermistor 10, the sensitivity potentiometer 12, and the lamp 14, the circuit components can generally be mounted on a circuit board. Typical component values are indicated in Table 1. The transistors $Q_1$, $Q_2$, $Q_3$, $Q_4$ and $Q_6$ can be RCA type SK3005, transistors $Q_5$, $Q_7$ and $Q_8$ can be RCA type SK3020, and the thermistor can be RCA type KD2108. If an audible signal is desired as well as the visual lamp then the circuit of FIG. 2 can be added. This produces a wailing sound that is very attention getting.

TABLE 1

| | |
|---|---|
| $C_1C_2$ = 15 microfarads, 15 volts, electrolytic | $R_2R_3$=39,000 ohms, ½ watt, 10% |
| | $R_4$ = 82 ohms, ¼watt, 10% |
| $C_3$ = 50 microfarads, 15 volts, electrolytic | $R_6$ = 330 ohms, watt, 10% |
| | $R_7R_{13}$=18ohms, ½watt, 10% |
| $C_4C_5$ = 0.01 microfarad | $R_8R_{10}$=470ohms, ½watt, 10% |
| $Q_5Q_7Q_8$ = transistors, RCA SK3020 | $R_9R_{11}$=150ohms, ½watt, 10% |
| $Q_1Q_2Q_3Q_4Q_6$ = transistors, RCA SK 3005 | $R_{12}$ = 68 ohms. ½watt, 10% |
| Lamp = No. 47 | Potentiometer = 10,000 ohms |
| $R_1R_5$ = 1000 ohms, ½ watt, 10% | Thermistor = RCA KD2108 |

Figure 2:
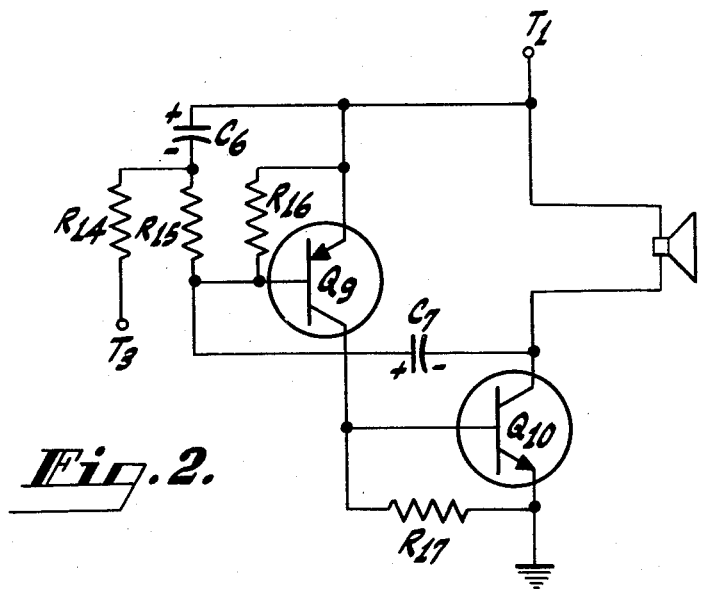
FIG. 2 is a schematic diagram of an alarm device adapted for use with the circuit of FIG. 1 to give off an audible signal.

In FIG. 2, when a signal voltage is applied to terminal $T_1$ capacitor $C_6$ begins to charge. As it does so, it makes the base of transistor $Q_9$ more and more negative until transistor $Q_9$ conducts. Current flowing in transistor $Q_9$ is amplified by transistor $Q_{10}$ and fedback to transistor $Q_9$ through capacitor $C_7$, causing the circuit to oscillate. The frequency of oscillation will increase as capacitor $C_6$ continues to charge. When the signal voltage is removed from terminal $T_1$, the circuit will continue to oscillate while $C_6$ is discharging until there is insufficient voltage to cause $Q_9$ to conduct. The values of $R_{14}$ and $C_6$ are selected so that $C_6$ is never discharged to the point where transistor $Q_9$ would stop conducting before the next signal is present at terminal $T_1$ thus resulting in the production of a wailing sound. Typical component values for FIG. 2 are indicated in Table II.

Figure 3:
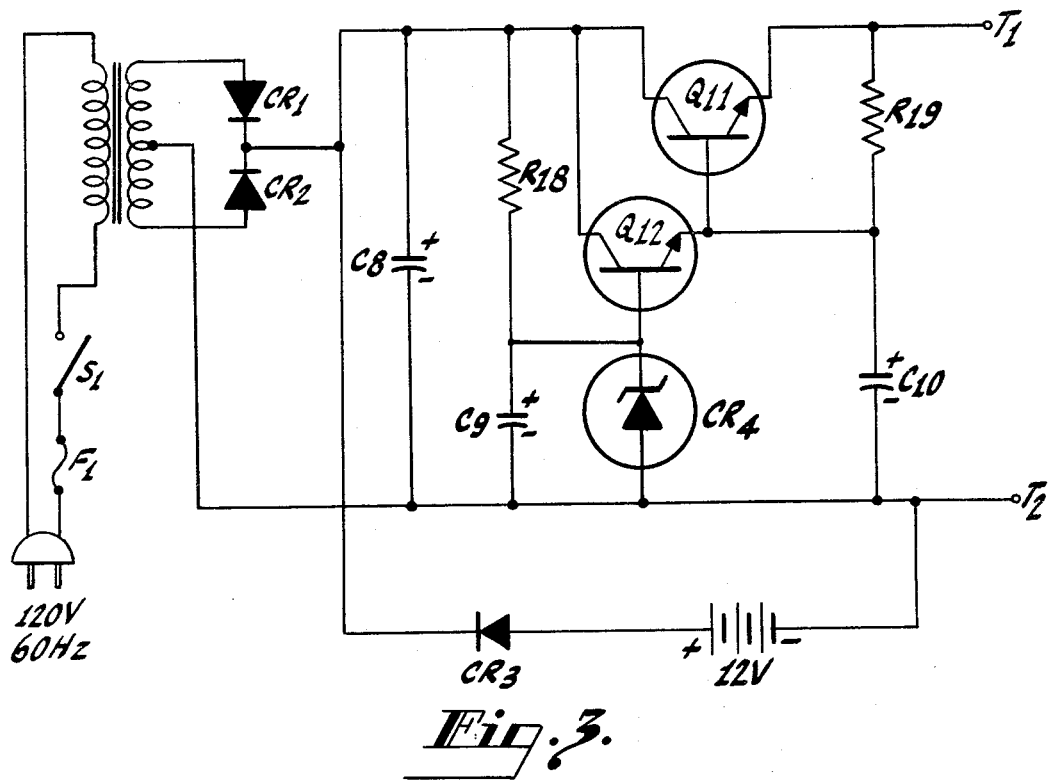
FIG. 3 is a schematic diagram of a supply circuit incorporating an emergency power source for providing power to the circuit of FIG. 1 in the event of a commercial power failure, thereby further insuring the integrity of the system.

TABLE II $C_6$ = 50 microfarads, 12 volts, electrolytic
$C_7$ = 0.018 microfarad, 25 volts or greater
$Q_9$ = transistor, RCA SK3020
$Q_{10}$ = transistor, RCA SK3005
$R_{14}$ = 27,000 ohms, ½ watt, 10%
$R_{15}$ = 68,000 ohms, ½ watt, 10
$R_{16}$ = 56,000 ohms, ½ watt, 10%
$R_{17}$ = 470 ohms, ½ watt, 10%
Speaker = 3.2-ohms or 8-ohms Any good alarm circuit should be constructed such that if a power failure is encountered the warning device will continue to operate. This can be provided for by floating a battery ahead of the regulator in the power supply as shown in FIG. 3. This power supply is designed so that the voltage across capacitor $C_8$ is 15 volts any time the transformer's primary is energized. No current will flow in or out of the battery since diode $CR_3$ is back biased. In the event of a power failure the voltage across capacitor $C_8$ will drop until diode $CR_3$ is forward biased and then current will flow out of the battery maintaining the input to the regulator at approximately 12 volts. The output of the supply in either case is maintained at a level of approximately 9 volts. Typical component values for FIG. 3 are indicated in Table III.

TABLE III

| | |
|---|---|
| $C_8$ = 4000 microfarads, 25 volts, electrolytic | $F_1$=fuse, 1 ampere, 125 volts |
| | $Q_{11}$=transistor, RCA SK3027 |
| $C_9$ = 100 microfarads, 15 volts, electrolytic | $Q_{12}$=transistor, RCA SK3020 |
| | $S_1$=switch, 124 volts, 1 ampere, single-pole, single-throw |
| $C_{10}$ = 0.1 microfarad, 25 volts or greater | |
| $CR_1$,$CR_2$,$CR_3$ = silicon rectifier, RCA SK3030 | $T_1$=transformer, 115 volts primary, 30 volts secondary with center tap |
| $CR_4$ = zener diode, 10 volts, 1 watt | |

Advantages of the disclosed invention include the following:

Since the method of operation is resistance comparison, the circuit is not affected by changes in supply voltages up to 50 percent;

Since both regenerative transistor switches are in close physical proximity, change in ambient temperature has little or no effect on the accuracy of the circuit;

As explained previously, a battery can be floated ahead of the regulator to insure continued operation in the event of a power failure. (Should a rechargeable battery be used, then a resistor connected across diode $CR_3$ would provide a trickle charge while the power supply is in operation);

the circuit can be readily modified to detect both increases and decreases in the condition being monitored.

In addition to temperature warning the circuit can be used for light sensing when the thermistor is replaced with a photo conductive cell. Similarly, it can be used with any resistance sensor, e.g. pressure; moisture; etc.

What is claimed is:

1. An alarm circuit for detecting change in the condition of an ambient comprising;
   first circuit means including a first pair of complementary transistors in a voltage dependent regenerative switch configuration;
   second circuit means including a second pair of complementary transistors in a voltage dependent regenerative switch configuration,
   said first and second circuit means being connected in parallel;
   means for supplying an intermittent voltage to said parallel combination;
   third circuit means for coupling a sensing element to one of said circuit means,
   the condition of said sensing element rendering said one of said regenerative switches conductive to the exclusion of the other in response to the application of said intermittent voltage;
   fourth circuit means including an alarm device,
   said alarm device being activated when a selected one of said regenerative switches is rendered conductive to the exclusion of the other.

2. An alarm circuit as described in claim 1, wherein said supply means comprises a D.C. power supply, a multivibrator, and a current amplifier.

3. An alarm circuit for detecting change in the condition of an ambient comprising:
   first circuit means including a first PNP transistor element having base, collector and emitter electrodes, and a first NPN transistor element having base, collector and emitter electrodes,
   the collector of said PNP element being connected to the base of said NPN element; the base of said PNP element being connected to the collector of said NPN element, a first resistance connected across the base and emitter of said PNP element a second resistance connected across the base and emitter of said NPN element, the emitter of said NPN element being connected to a point of reference potential;
   second circuit means including a second PNP transistor element having base, collector and emitter electrodes, and a second NPN transistor element having base, collector and emitter electrodes,
   the collector of said second PNP element being connected to the base of said second NPN element, the base of said second PNP element being connected to the collector of said second NPN element, a third resistance connected across the base and emitter of said second PNP element, a fourth resistance connected between the base of said second NPN element and a point of reference potential, a fifth resistance connected between the emitter of said NPN element and a point of reference potential;
   first and second capacitive elements connected respectively across said first and third resistances;
   a variable resistance element connected between the base of said second PNP element and a point of reference potential;
   a sensing element responsive to the condition of the ambient being monitored, said sensing element connected between the base of said first PNP element and a point of reference potential;
   third circuit means including an alarm device and a third NPN transistor element having base, collector and emitter electrodes,
   the base of said third NPN element being connected to the emitter of said second NPN element, the emitter of said third NPN element being connected to a point of reference potential, the collector of said third NPN element being serially coupled to said alarm device; and means for supplying an intermittent voltage, said means coupled to said first, second and third circuit means.

4 An alarm circuit as described in claim 3 wherein said supply means comprises a D.C. power supply, multivibrator, and a current amplifier.

5. An alarm circuit for detecting changes in the condition of an ambient comprising;
first circuit means including a first pair of complementary transistors in a voltage dependent regenerative switch configuration;
second circuit means including a second pair of complementary transistors in a voltage dependent regenerative switch configuration,
said first and second circuit means being connected in parallel;
means for supplying an intermittent voltage to said parallel combination;
an alarm device coupled to said second circuit means, said alarm device being activated when said second regenerative switch becomes conductive; and
a condition sensitive element having a resistance characteristic that varies as a function of the condition being monitored,
said element being coupled to said first circuit means to cause said first regenerative switch configuration to be normally conducting to the exclusion of said second regenerative switch configuration, and to further cause said second regenerative switch configuration to become conductive to the exclusion of said first regenerative switch configuration when said element exhibits a predetermined resistance, whereby said alarm device is activated.

6. An alarm circuit for detecting changes in the condition of an ambient comprising:
first circuit means including a first pair of complementary transistors in a voltage dependent regenerative switch configuration;
second circuit means including a second pair of complementary transistors in a voltage dependent regenerative switch configuration,
said first and second circuit means being connected in parallel;
means for supplying an intermittent voltage to said parallel combination;
an alarm device coupled to said second circuit means, said alarm device being activated when said second regenerative switch becomes conductive; and
a condition sensitive element having a resistance characteristic that varies as a function of the condition being monitored,
said element being coupled to said second circuit means to cause said first regenerative switch configuration to be normally conducting to the exclusion of said second regenerative switch configuration, and to further cause said second regenerative switch configuration to become conductive to the exclusion of said first regenerative switch configuration when said element exhibits a predetermined resistance, whereby said alarm device is activated.

* * * * *